(12) United States Patent
Kim

(10) Patent No.: US 11,058,253 B2
(45) Date of Patent: Jul. 13, 2021

(54) COOKING DEVICE HAVING COOKING GLASS BOWL AND HANDLE STRUCTURE THEREOF

(71) Applicant: Hong Bae Kim, Paju-si (KR)

(72) Inventor: Hong Bae Kim, Paju-si (KR)

(73) Assignee: Hong Bae Kim, Paju-si (KR)

( * ) Notice: Subject to any disclaimer, the term of this patent is extended or adjusted under 35 U.S.C. 154(b) by 215 days.

(21) Appl. No.: 16/094,327

(22) PCT Filed: Jul. 19, 2017

(86) PCT No.: PCT/KR2017/007785
§ 371 (c)(1),
(2) Date: Oct. 17, 2018

(87) PCT Pub. No.: WO2018/016880
PCT Pub. Date: Jan. 25, 2018

(65) Prior Publication Data
US 2019/0117013 A1    Apr. 25, 2019

(30) Foreign Application Priority Data

Jul. 19, 2016 (KR) .................. 10-2016-0091481
Jul. 19, 2017 (KR) .................. 10-2017-0091273

(51) Int. Cl.
*A47J 43/04* (2006.01)
*A47J 36/24* (2006.01)
(Continued)

(52) U.S. Cl.
CPC ............. *A47J 36/24* (2013.01); *A47J 36/165* (2013.01); *A47J 43/04* (2013.01); *A47J 43/075* (2013.01);
(Continued)

(58) Field of Classification Search
CPC ...... A47J 43/04; A47J 43/0716; A47J 19/027; A47J 45/10; A47J 45/08; A47J 45/077;
(Continued)

(56) References Cited

U.S. PATENT DOCUMENTS 5,613,274 A * 3/1997 Gerdmann ............... A47J 45/08
220/753
2004/0042337 A1 * 3/2004 Yiu ........................ A47J 43/046
366/199

(Continued)

FOREIGN PATENT DOCUMENTS

CN    1480093 A    3/2004
CN    1575716 A    2/2005
(Continued)

OTHER PUBLICATIONS

Office Action dated Feb. 25, 2020, from the Japanese Patent Office in Application No. 2019-524103.
(Continued)

*Primary Examiner* — Reginald Alexander
(74) *Attorney, Agent, or Firm* — Sughrue Mion, PLLC

(57) ABSTRACT

The present invention related to a cooking device having a cooking glass bowl, wherein the cooking glass bowl has a large weight to improve the safety of the cooling device during operation of the cooling device equipped with a high-speed motor. The cooking device having the cooking glass bowl according to the present invention, comprises: a glass bowl portion (100) including a cooking glass bowl (110) having a handle base (111) extending from and integrally formed with an outer side surface of one side thereof, a bowl base (120) including a heater (170) and fastened to an outer circumferential surface of a lower end of the cooking glass bowl (110), and handle portions (400, 500) fastened and fixed at opposite ends of the handle base by being brought into close contact with each other so as to (Continued)

cover the handle base (111) of the cooking glass bowl (110) while maintaining a tight contact state in a direction perpendicular to the outer circumferential surface of the cooking glass bowl (110); and a body portion (200) which generates a driving force in an internal space formed inside thereof and supplies a power to the heater (170) or a generator (260) by voltage conversion.

16 Claims, 15 Drawing Sheets

(51) Int. Cl.
*A47J 43/07* (2006.01)
*A47J 45/07* (2006.01)
*A47J 43/08* (2006.01)
*A47J 36/16* (2006.01)
*A47J 45/08* (2006.01)

(52) U.S. Cl.
CPC ....... *A47J 43/0766* (2013.01); *A47J 43/0772* (2013.01); *A47J 43/08* (2013.01); *A47J 45/077* (2013.01); *A47J 45/08* (2013.01); *A47J 43/0716* (2013.01); *A47J 45/07* (2013.01); *A47J 2202/00* (2013.01); *A47J 2203/00* (2013.01)

(58) Field of Classification Search
CPC ........ A47J 45/07; A47J 45/066; A47J 45/062; A47J 45/06; A47J 43/0766; A23N 1/02
USPC .............................. 99/510, 513; 16/425, 444
See application file for complete search history.

(56) References Cited

U.S. PATENT DOCUMENTS

| | | | |
|---|---|---|---|
| 2004/0042338 A1* | 3/2004 | Wu | A47J 43/0727 366/205 |
| 2013/0248627 A1* | 9/2013 | Huang | A47J 27/004 241/36 |
| 2015/0101491 A1* | 4/2015 | Lin | A47J 27/004 99/348 |
| 2015/0117137 A1 | 4/2015 | Haney et al. | |

FOREIGN PATENT DOCUMENTS

| | | | | |
|---|---|---|---|---|
| CN | 201445383 U | 5/2010 | | |
| CN | 203506474 U | 4/2014 | | |
| CN | 104055434 A | 9/2014 | | |
| CN | 204618000 U | 9/2015 | | |
| EP | 1 493 370 A1 | 1/2005 | | |
| JP | 57-005121 U | 1/1982 | | |
| JP | 06-044727 U | 6/1994 | | |
| JP | 2009-112546 A | 5/2009 | | |
| JP | 2011-244910 A | 12/2011 | | |
| JP | 6336205 B2 * | 6/2018 | ........ | B01F 15/00175 |
| KR | 20-1989-0005106 Y1 | 8/1989 | | |
| KR | 20-0385426 Y1 | 5/2005 | | |
| KR | 10-2011-0016851 A | 2/2011 | | |
| KR | 10-2011-0137493 A | 12/2011 | | |
| KR | 10-1216942 B1 | 12/2012 | | |
| KR | 10-1432704 B1 | 8/2014 | | |
| WO | 2014/147346 A1 | 9/2014 | | |

OTHER PUBLICATIONS

International Search Report of PCT/KR2017/007785 dated Nov. 15, 2017.
Office Action dated Feb. 2, 2021 in Chinese Application No. 201780027004.0.

\* cited by examiner

[FIG. 1]
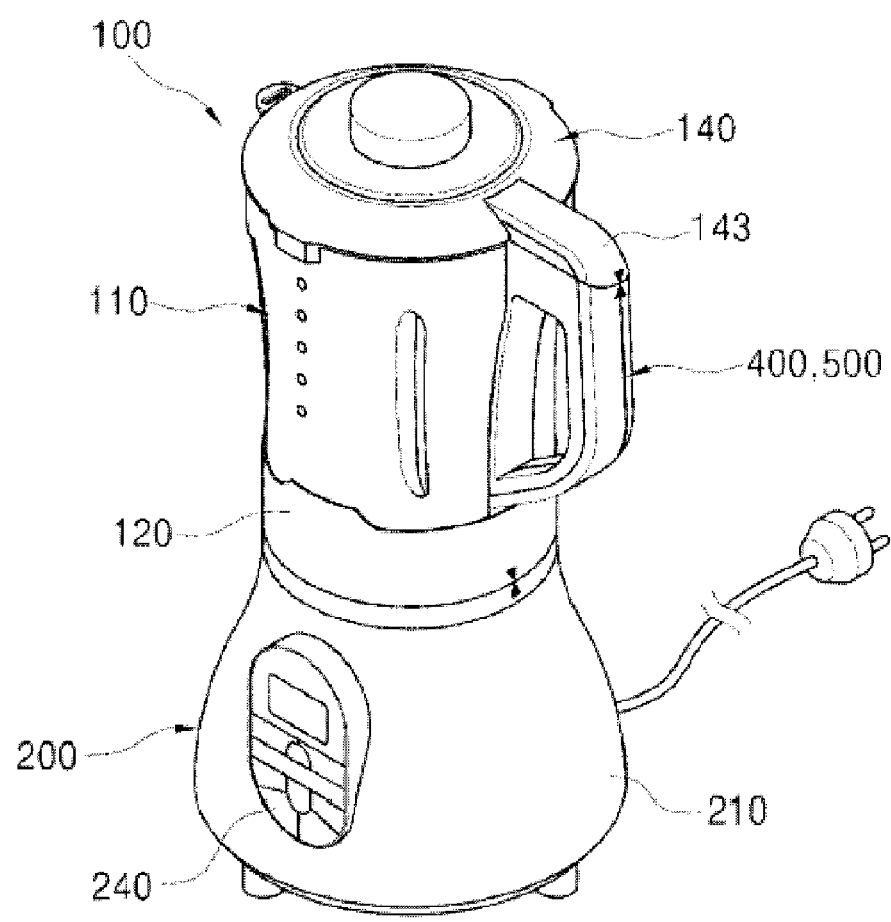

[FIG. 2]
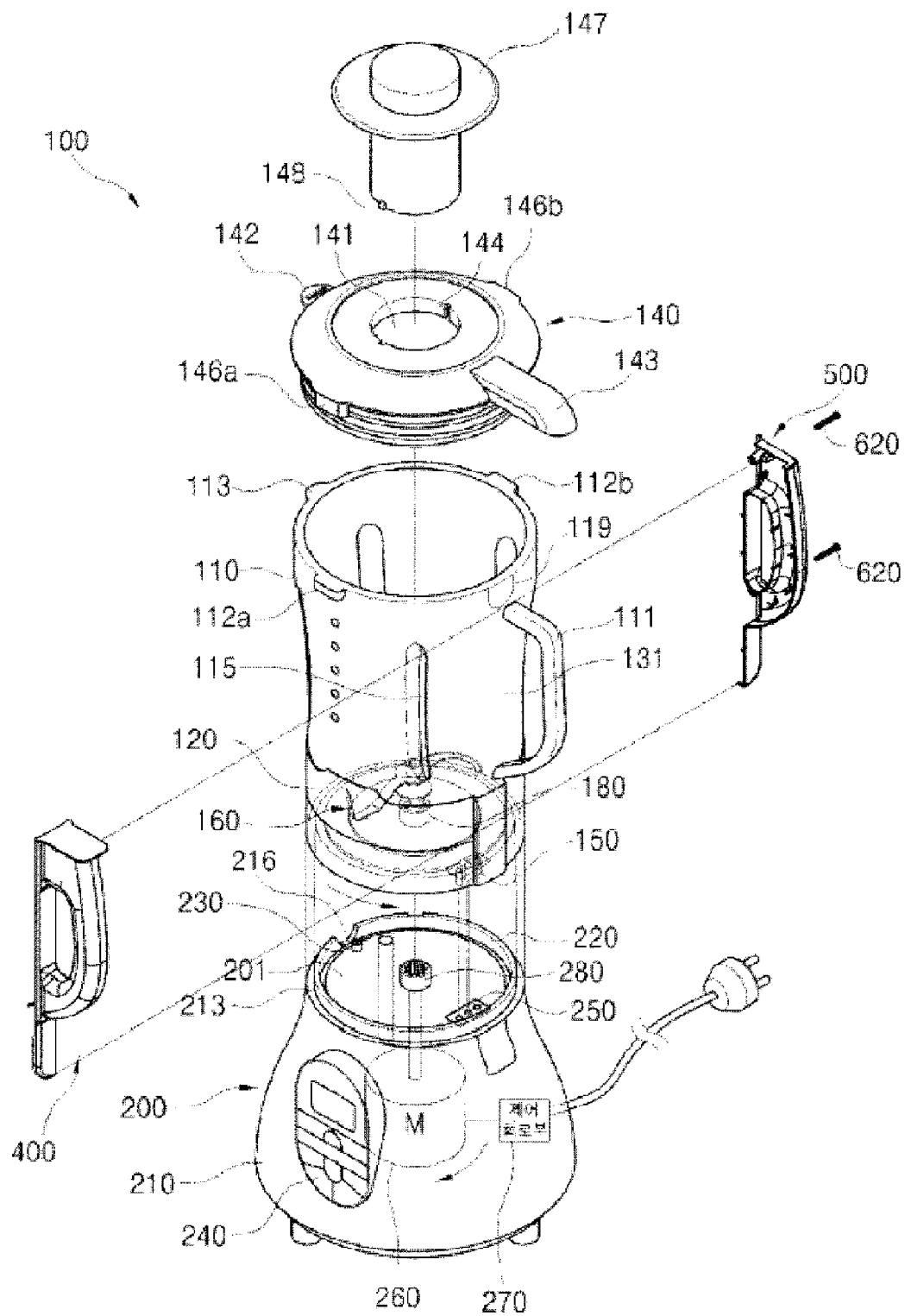

[FIG. 3]
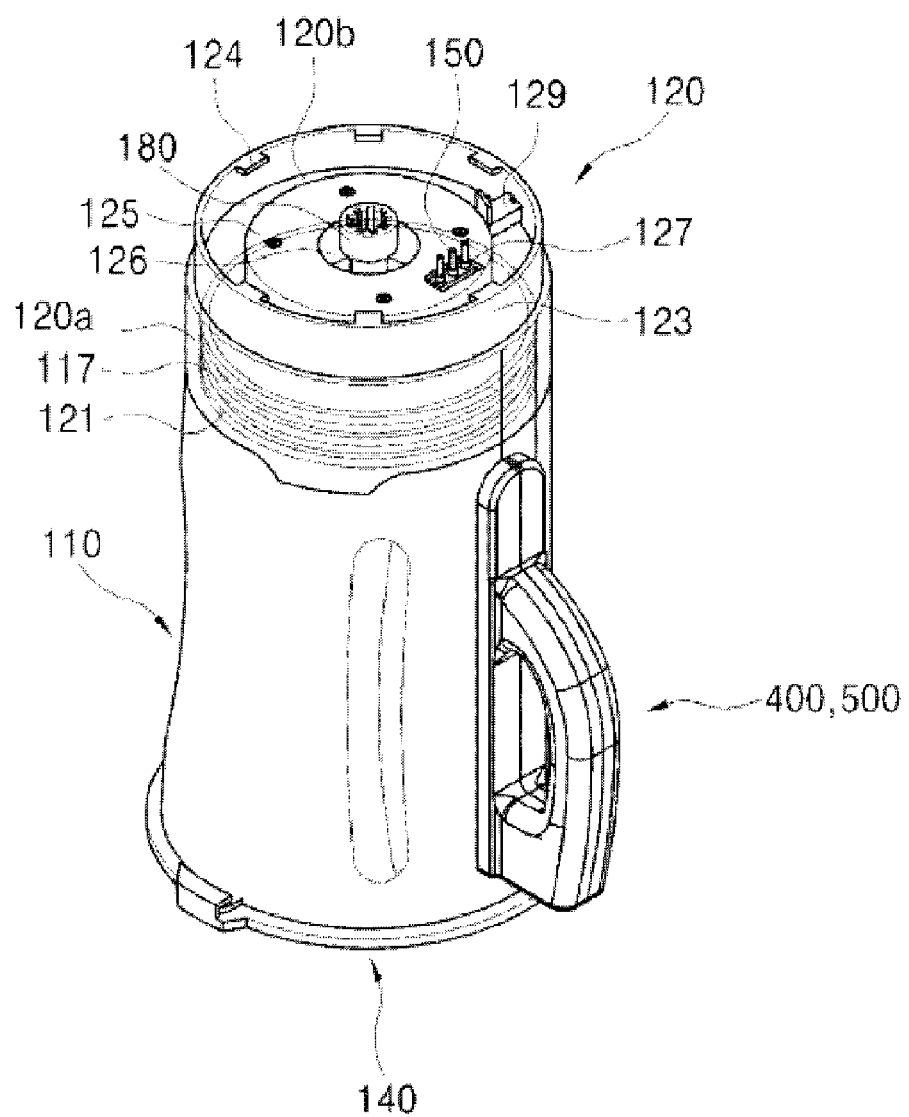

[FIG. 4A]
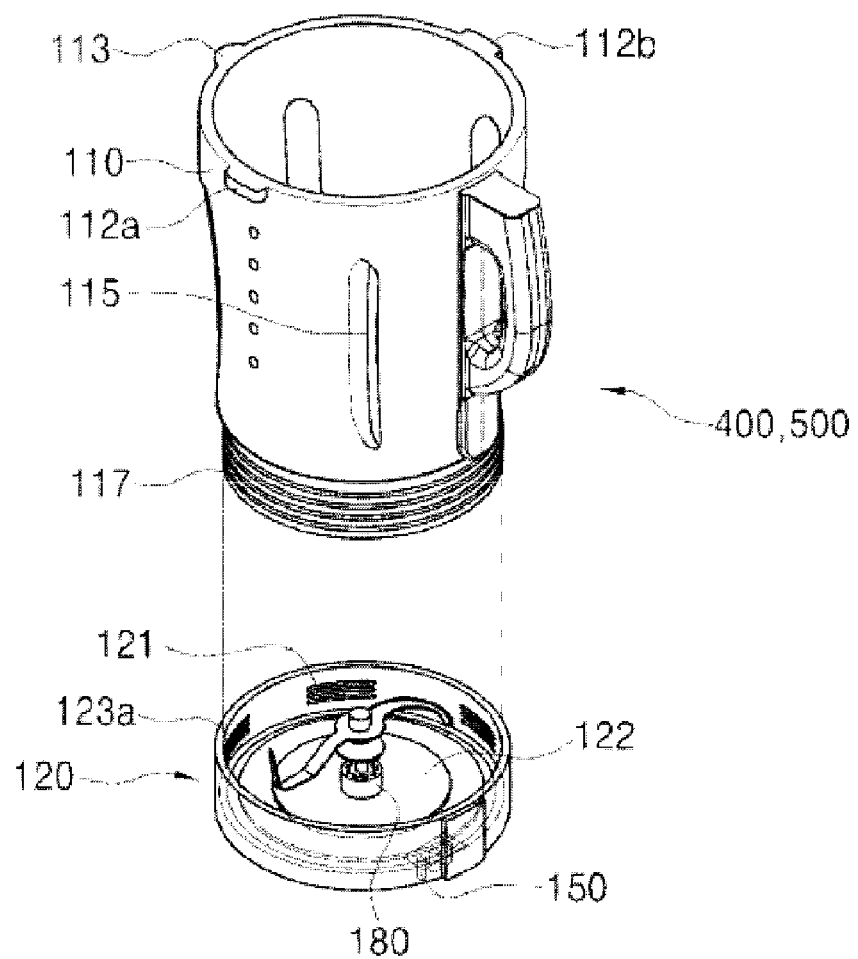

[FIG. 4B]
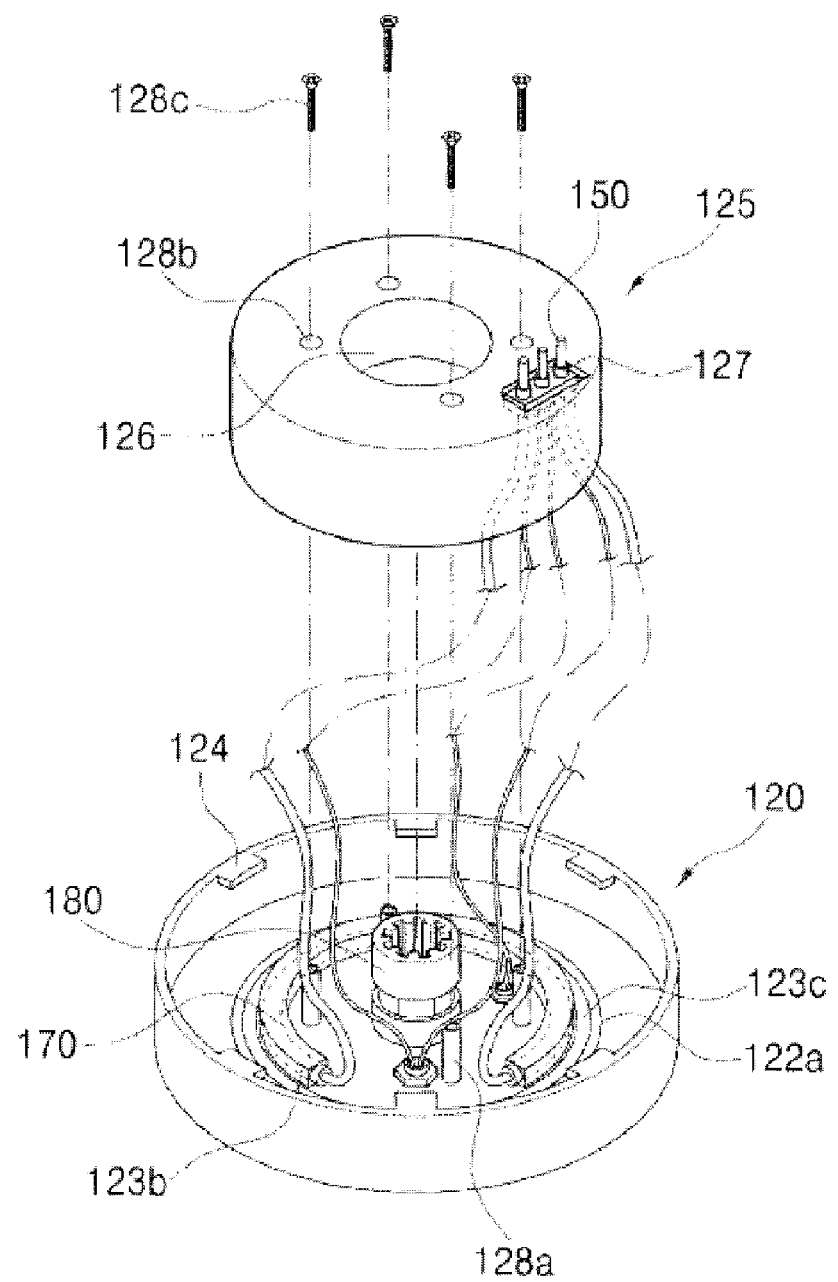

[FIG. 5A]
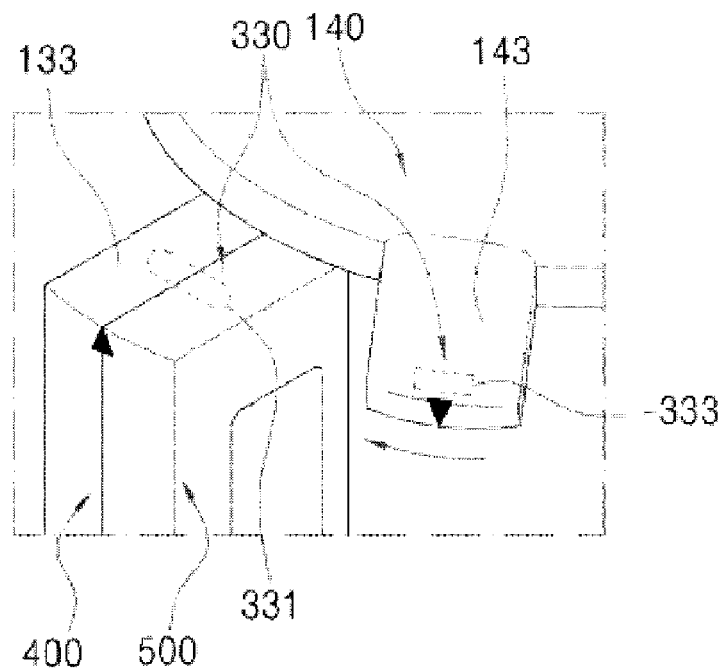
[FIG. 5B]
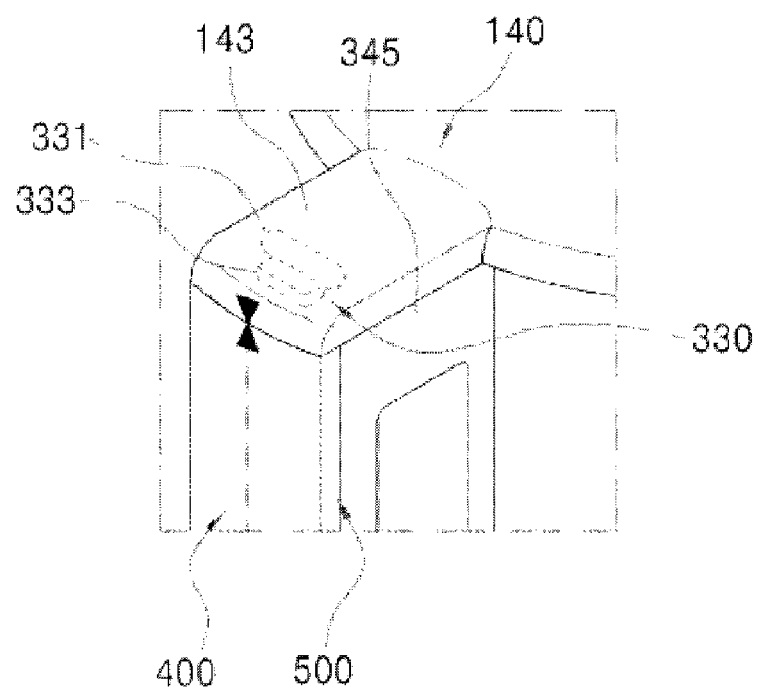

[FIG. 6A]
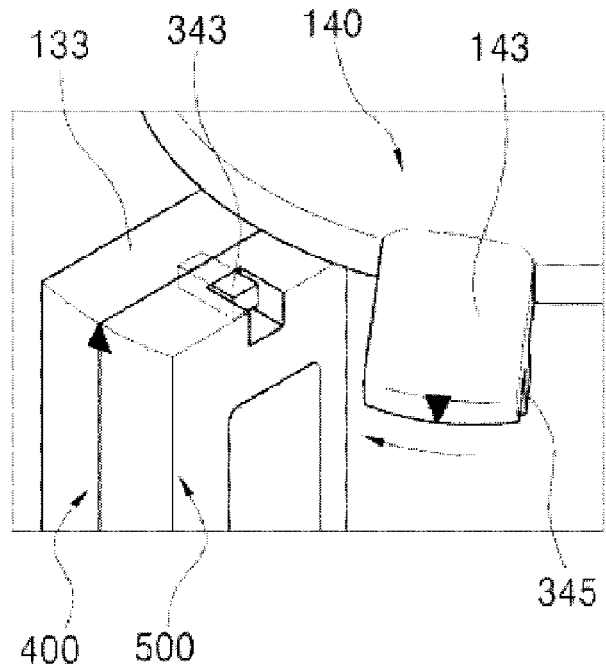
[FIG. 6B]
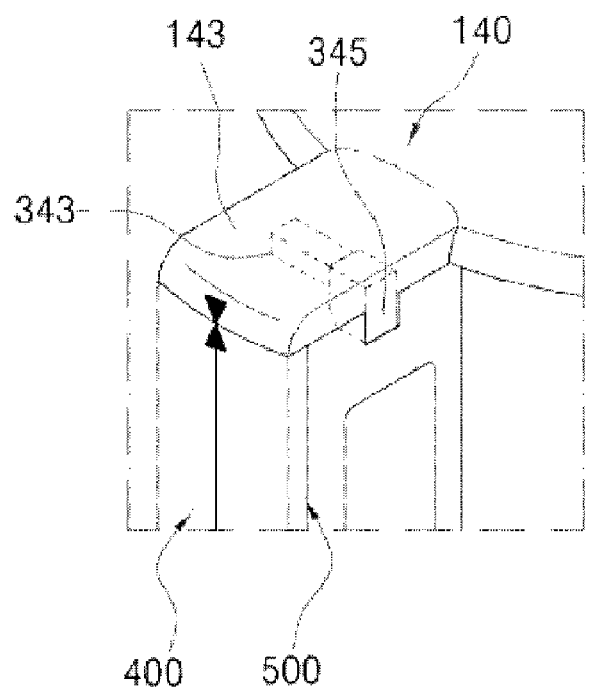

[FIG. 6C]
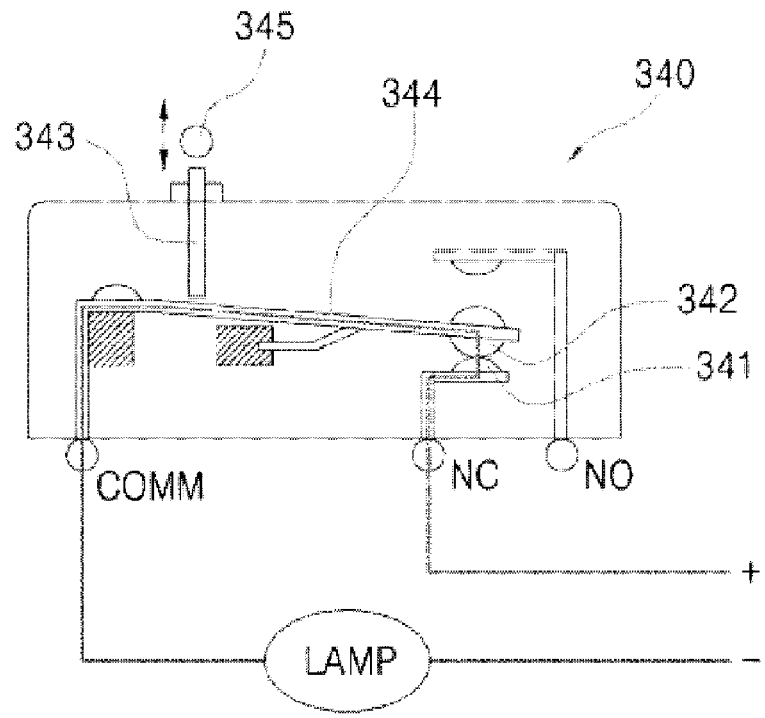
[FIG. 6D]
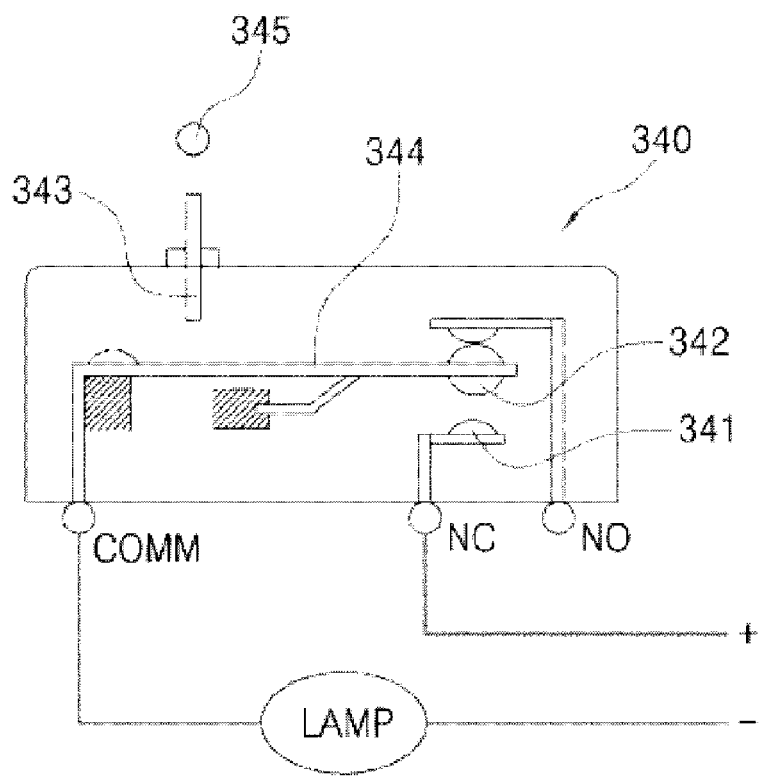

[FIG. 7]
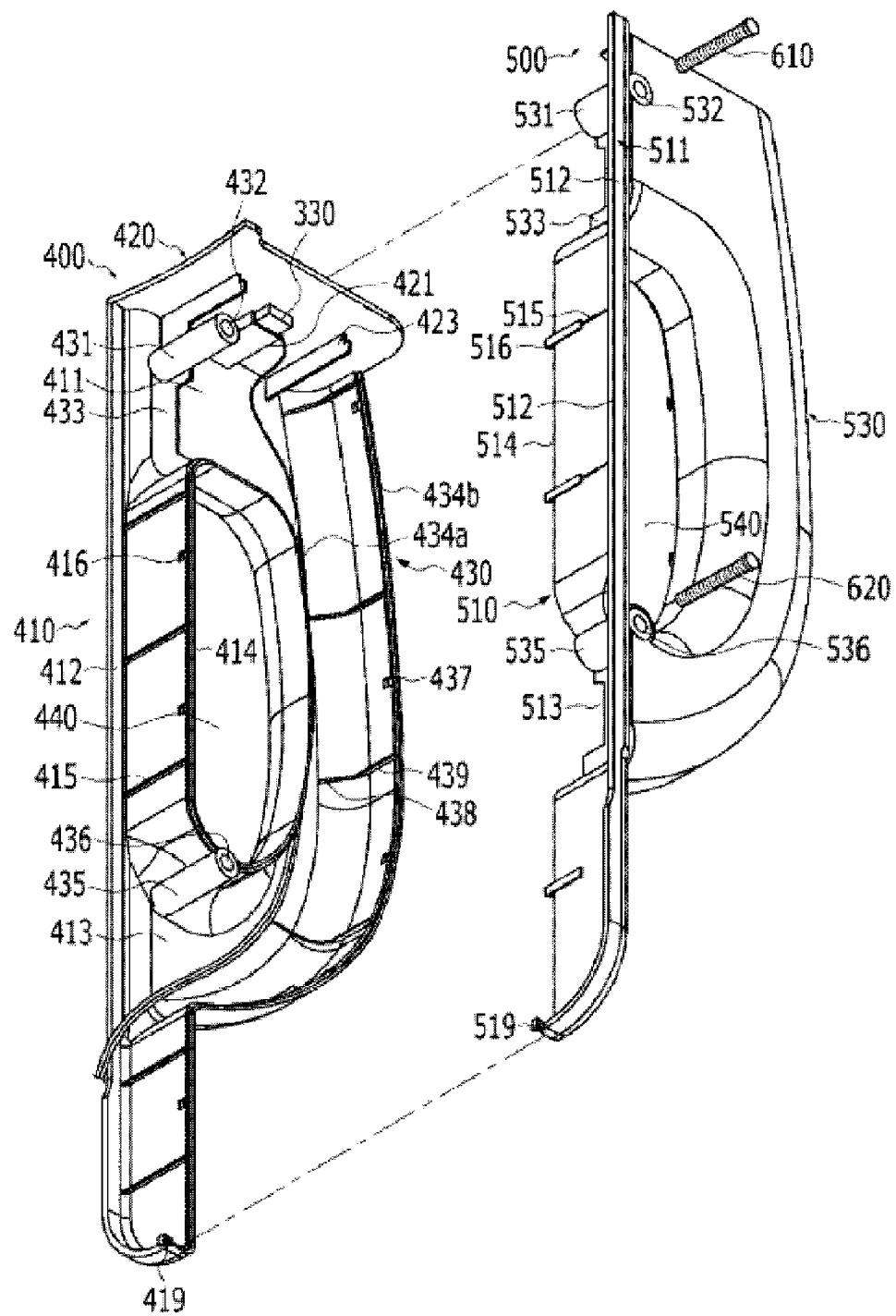

[FIG. 8]
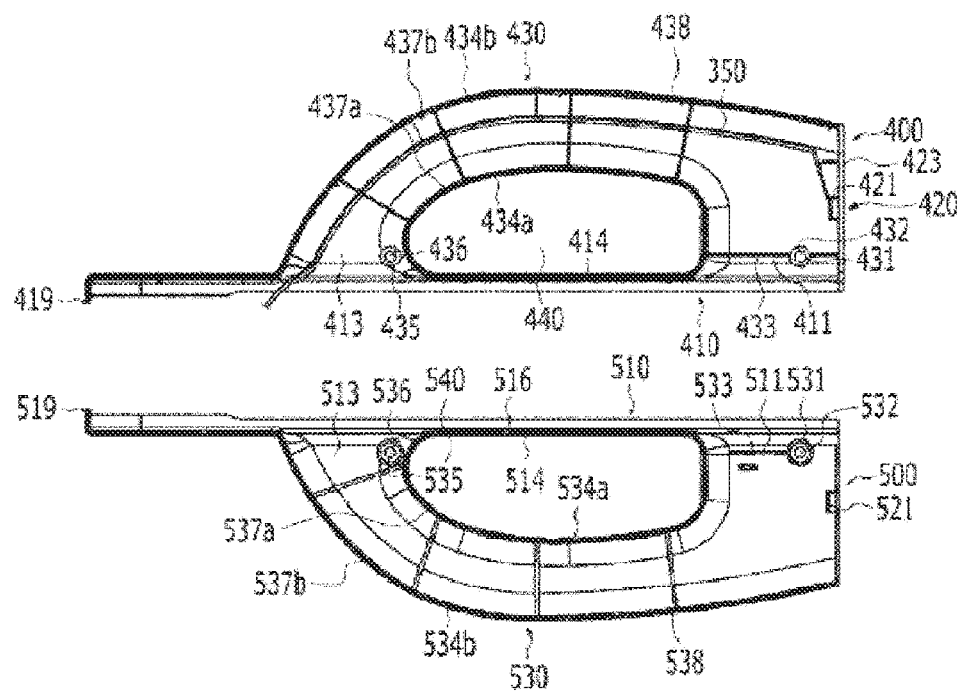
[FIG. 9]
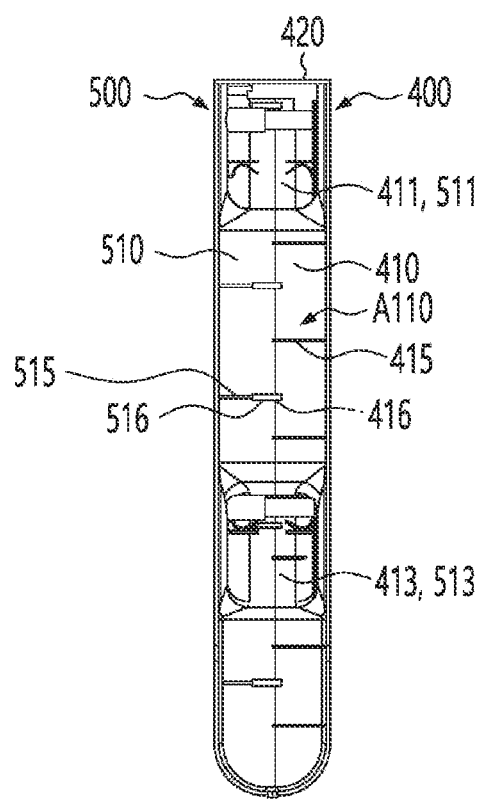

[FIG. 10]
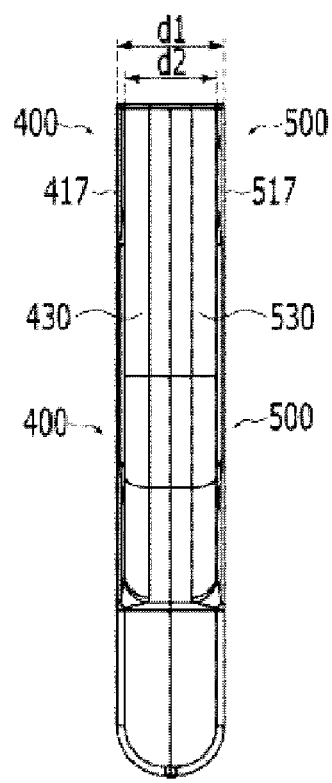
[FIG. 11]
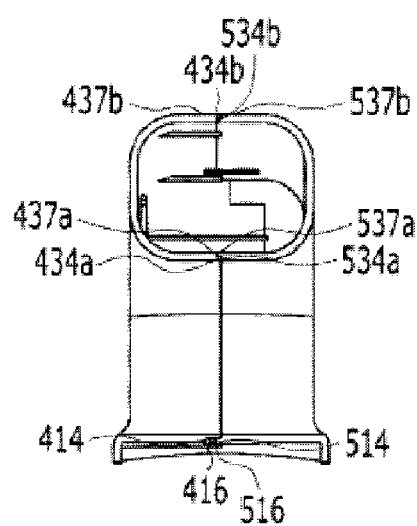

[FIG. 12]
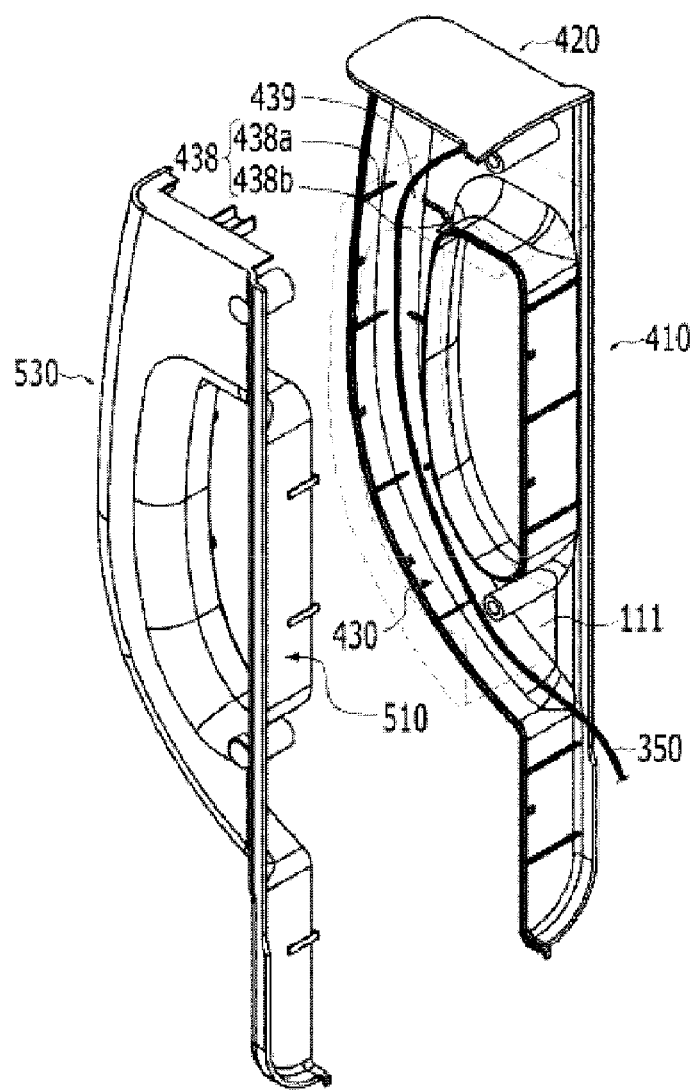

[FIG. 13]
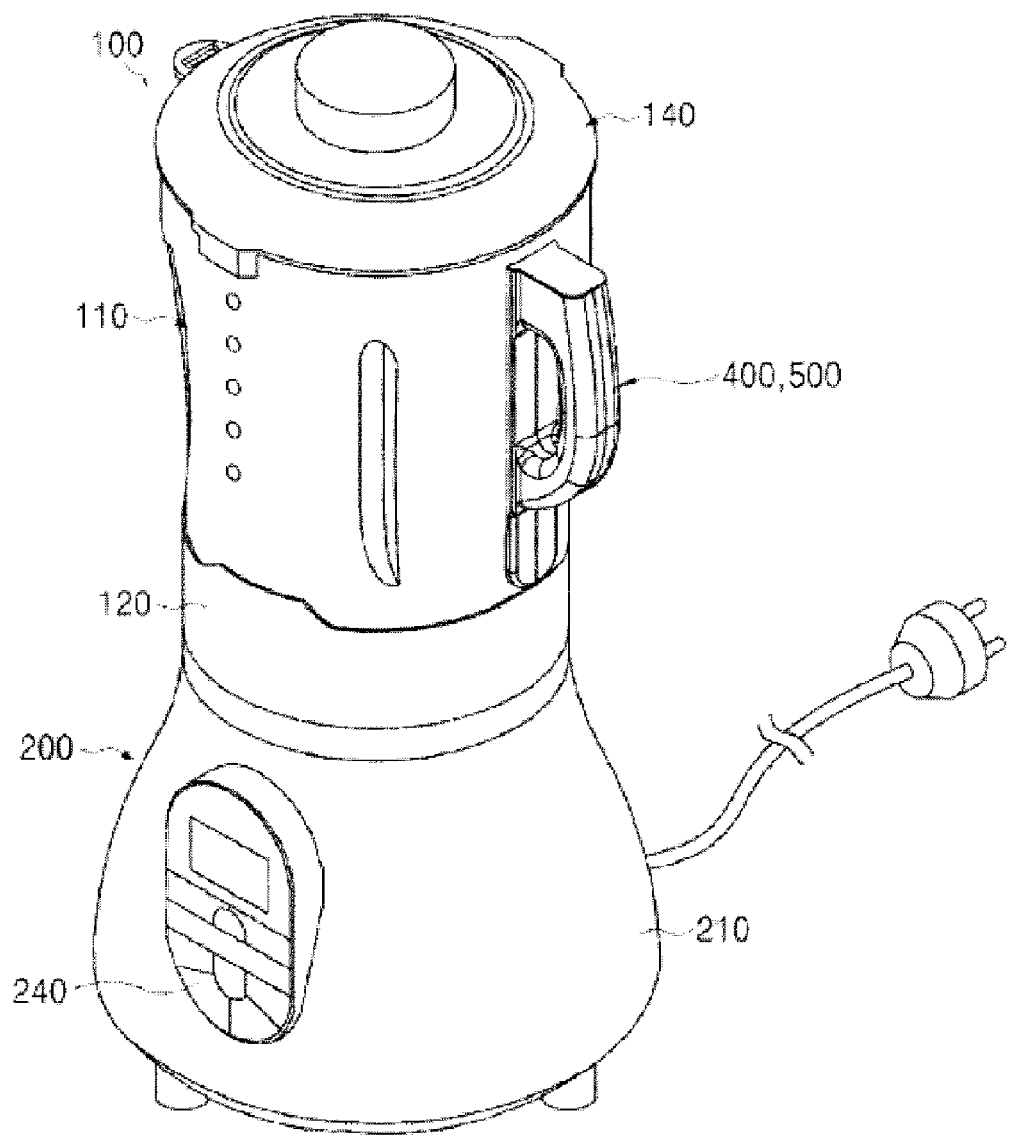

[FIG. 14]
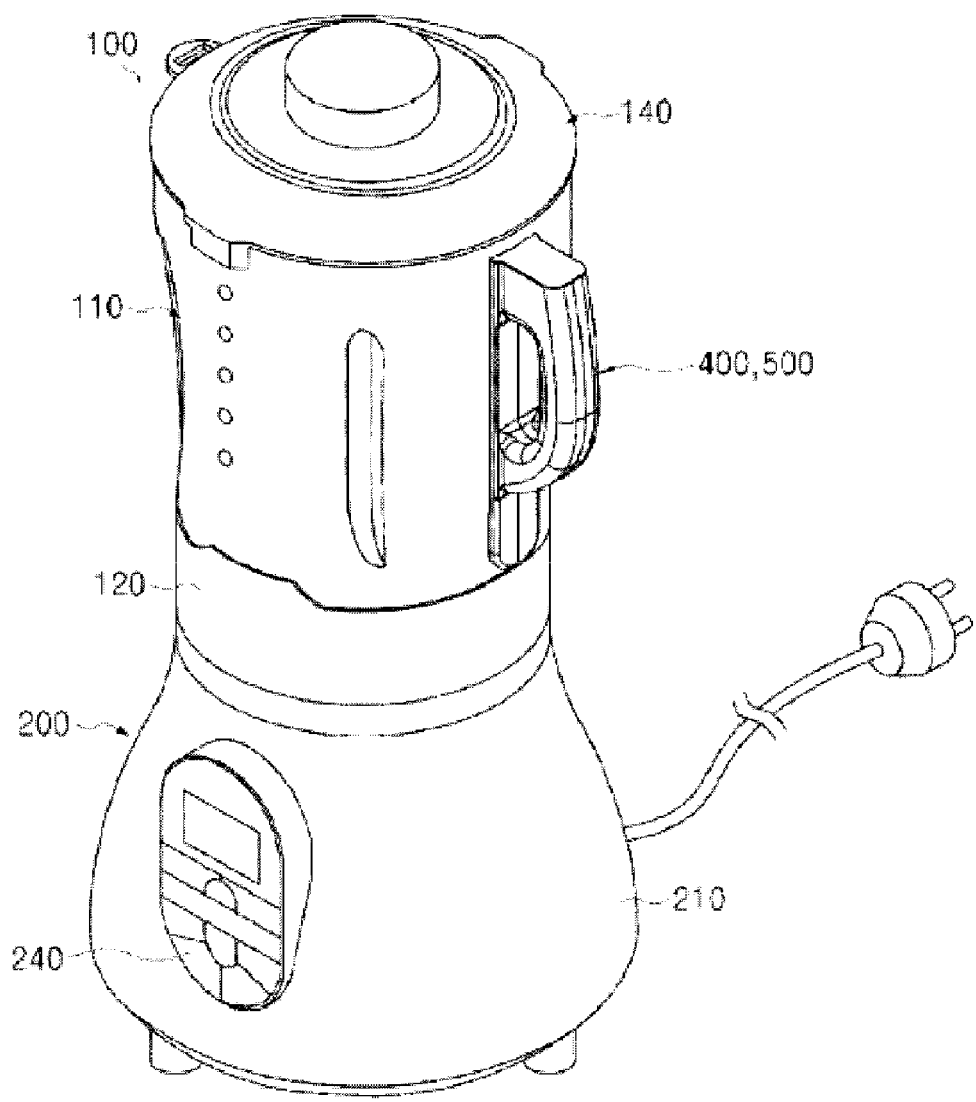

[FIG. 15]
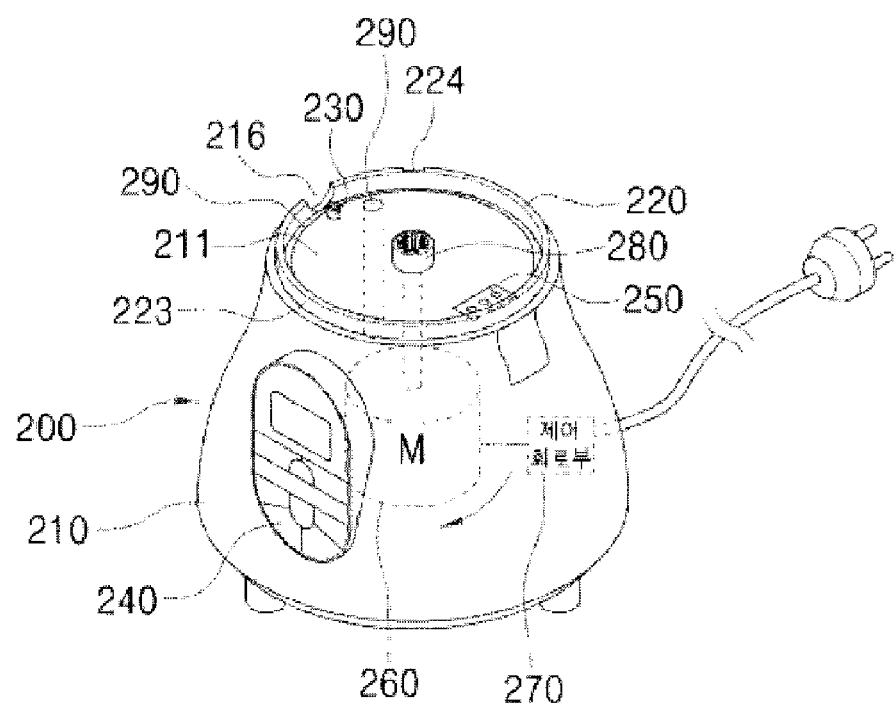

COOKING DEVICE HAVING COOKING GLASS BOWL AND HANDLE STRUCTURE THEREOF

CROSS REFERENCE TO RELATED APPLICATIONS

This application is a National Stage of International Application No. PCT/KR2017/007785 filed Jul. 19, 2017, claiming priority based on Korean Patent Application No. 10-2016-0091481 filed Jul. 19, 2016 and Korean Patent Application No. 10-2017-0091273 filed Jul. 19, 2017.

FIELD OF THE INVENTION

The present invention relates to a cooking instrument having glass cooking bowl, and more specifically, to a cooking instrument having glass cooking bowl and grip structure thereof in which cooking bowl of glass material is used which may improve safety from vibration and high-temperature generated on operation of cooking instrument having high-speed rotation motor for grinding of cooking ingredient and heater for heating of cooking ingredient.

BACKGROUND

Recently, a trend is remarkable that development of cooking instruments which may automatically cook food for health such as vegetable juice or detoxification juice is a boom, according to increase in concern on health.

Such a cooking instrument are developed and sold in a variety of types of product, from ones making a variety of juices by simply grinding cooking ingredient such as a blender, to ones cooking a variety of food such as soybean milk, tofu, soup, or juice by performing selectively grinding, mixing, and heating of cooking ingredient.

In a Korean registered patent gazette of 10-0495838 (Jun. 8, 2005), 'a food processor having grinding and heating function and a food processing method using the same' is disclosed, which has object to provide with a useful food processor for processing of tofu, soybean milk, soup, porridge or food having grinding and heating function, and which comprises a bowl portion having a grinding room in which a blade for grinding food ingredient is installed on the floor face, a main body portion detachably connected to the bowl portion, a heating portion formed at the main body portion, a driving portion for driving of the blade, and a control portion.

In a Korean registered patent gazette of 10-0770641 (Oct. 22, 2007), a cooking apparatus of indirect heating way is disclosed, which comprises a separation container in which a screen is formed on a side face, a grip having engaging contact point, a detecting sensor, a heater of plate shape capable of control of caloric value, a base embedded with a motor and a control device, and a safety device.

And in a Korean registered patent gazette of 10-1216942 filed by the same applicant as the present invention, an automatic cooker is disclosed, in which safety is improved by allowing firmly engagement of upper portion housing (bowl portion) and lower portion housing (main body portion) of the automatic cooker.

The bowl portions used in cooking instruments having heater among these prior art are all adapted with cooking bowl of material of metal such as stainless steel. The reason for using cooking bowl of such a metallic material is why there is a need for installation of heater for heating the cooking bowl on a lower face of the cooking bowl, and there is a need by necessity for installation of sensor for detecting foam generated inside of the cooking bowl or for detecting temperature.

On the other hand, almost all of blender products grinding vegetables or fruits among these prior art are adapted with cooking bowl of glass material. And a trend shows that products having motor with rotation speed of high-speed rotation of 3,000 rpm or more are sold as a popular cooking instrument.

In this circumstances, a development of cooking instrument with bowl portion of cooking bowl of glass material while having a heater capable of heating cooking ingredient is expected, and specifically, a development of cooking instrument is expected in which a cooking bowl of glass material is used, while a variety of sensors such as foam detection sensor or temperature detection sensor can be installed at the cooking bowl.

DISCLOSURE

Technical Problem

The present invention is to settle the problems of prior arts described above, an object of which is to provide with a cooking instrument having a glass cooking bowl which can improve safety, by increasing weight of the cooking bowl on operation of the cooking instrument having a high-speed rotation motor.

Another object of the present invention is to provide with a cooking instrument having a glass cooking bowl in which a wire supplying power source to a foam detection sensor detecting foam at a preset upper portion critical position inside the cooking bowl, and a temperature detection sensor detecting temperature at a preset lower portion critical position can be installed respectively without exposure outside of the cooking bowl.

Further another object of the present invention is to provide with a cooking instrument having glass cooking bowl and a grip structure of the same which can effectively attenuate high temperature generated inside of the glass cooking bowl in case that a specific food is cooked by heating inside of the glass cooking bowl to a high temperature.

Even further another object of the present invention is to provide with a cooking instrument having glass cooking bowl and a grip structure of the same which can not only continuously maintain the open-close sensing switch terminal position installed inside of grip from vibration of the glass cooking bowl, but also continuously maintain the contact point of the open-close sensing switch and wiring, in case that a specific cooking ingredient is grinded by high-speed rotation of the grinding blade installed inside of the glass cooking bowl.

Technical Solution

To achieve the object of the present invention above, a cooking instrument having glass cooking bowl according to the present invention may be characterized in comprising a glass bowl portion 100 including a glass cooking bowl 110 which being formed in a shape into which at least one or more cooking ingredient being inputted, on one outer side face of which a grip base 111 being extended to be formed integrally, and in which a blade 160 for either grinding or mixing the cooking ingredient being installed; a bowl base 120 which being provided with a heater 170 to heat the cooking bowl 110 installed at a lower face of the glass cooking bowl 110 and being assembled to a lower end outer circumferential face of the glass cooking bowl 110 in either a screw engaging way or a bolting assembly way; grip portions 400 and 500 which being assembled and fixed each other with being contacted closely from both sides to enclose the grip base 111 of the glass cooking bowl 110 with maintaining the closely contacted status in a vertical direction with respect to an outer circumferential face of the glass cooking bowl 110; and a cover portion 140 which performing open-close of opened upper portion of the glass cooking bowl 110; and a main body portion 200 including a housing 210 which being engaged detachably to a lower end portion of the bowl base 120 and which being provided with a driving force generator 260 generating driving force at an inner space formed thereinside; an upper base 220 of which the size being formed relatively smaller than that of an upper end outer peripheral edge of the housing 210 and which being extended and formed integrally in an upper portion direction in a predetermined length and predetermined thickness; and a control circuit portion 270 which being installed at an inner space of the housing 210 and voltage converting a power source supplied from outside to supply the same to either the heater or the driving force generator 260; wherein the control circuit portion 270 cognizing a status in which the cover portion 140 firstly engaging the upper portion of the glass cooking bowl 110 to seal and the glass bowl portion 100 engaged with the cover portion 140 secondly engaging the upper base 220 formed on an upper portion of the housing 210 as a power source supply ready status, and according to a control command of a user, supplying the power source supplied from outside to the driving force generating portion 260 or/and to the heater 170.

And, the first and second grip portions 400 and 500 may be characterized in comprising first and second base portions 410 and 510 which being assembled with close contact each other to form a bilateral symmetry structure, in which each of first and second upper openings 411 and 511 and first and second lower openings 413 and 513 being formed at an upper end portion and lower end portion for the grip base 111 to penetrate in an assembled status, and between which and outer circumferential face of the glass cooking bowl 110, first and second bending ends 417 and 517 which being bent in a perpendicular direction according to an outer circumferential face being extended and formed in a lateral direction in a predetermined length for a predetermined heat declining space A110 to be formed in a status which being fixed to an outer circumferential face of the glass cooking bowl 110;

an upper plate 420 which being extended and formed integrally at an upper portion of the first or second base 410 or 510 in a horizontal direction, at lower face of which a sensor installation aperture 421 being formed at which temperature detecting or open-close detecting sensor being fixed and installed for detecting open-close of the glass cooking bowl 110, and which covering an upper portion of the first or second base 410 or 510 when the first and second base portions 410 and 510 being assembled; and first and second grip pipes 430 and 530 which being assembled with close contact each other, at center portion of which first and second gripping openings 440 and 540 being formed in assembled status, which being extended and formed integrally with the first and second base portions 410 and 510 and upper plate 420 with forming a grip base installation space A120 in which the grip base 111 being inserted, in which each of a first upper engaging protrusion 431 and a first lower engaging protrusion 435 being projected and formed to a position where the first upper opening 411 and first lower opening 413 contacting, and in which each of a second upper engaging protrusion 531 and a second lower engaging protrusion 535 being projected and formed to a position where the second upper opening 511 and second lower opening 513 contacting.

Advantageous Effects

The cooking instrument having glass cooking bowl and the grip structure thereof according to the present invention as described above not only can improve safety by increasing weight of cooking bowl on operation of cooking instrument having high-speed rotation motor, but also glass cooking bowl and heating engaging plate can be assembled with ease when assembling product, by which reliability of product and convenience of fabrication can be improved than prior art.

In addition, a wire supplying power source to the foam detection sensor detecting foam at a preset upper portion critical position inside of cooking bowl and a temperature detection sensor detecting temperature at a preset lower portion critical position can be installed without exposure to outside of cooking bowl, by which there is no need to form an additional structure to expose the wire outside or to arrange the wire for supplying power source to the foam detection sensor or temperature detection sensor.

In addition, in case that a specific food is cooked by heating inside of the glass cooking bowl to a high temperature, the high temperature generated inside of the glass cooking bowl can be decreased with efficiency, by which there comes an effect that heat generated inside of the glass cooking bowl can be decreased maximum even though the grip is seized just after heating of the glass cooking bowl.

In addition, in case that a specific cooking ingredient is grinded by rotating the grinding blade in high speed installed inside of the glass cooking bowl, not only the terminal position of open-close sensing switch installed inside of the grip can be maintained continuously against the vibration of the glass cooking bowl, but also contact point of the open-close sensing switch and wiring can be maintained continuously, by which as a result there comes an effect that an Emergency Stop of the cooking instrument because of breakaway of terminal position or fault of wiring contact point.

BRIEF DESCRIPTION OF DRAWINGS

FIG. 1 is a perspective view of a cooking instrument having glass cooking bowl according to a desirable embodiment of the present invention;

FIG. 2 is an exploded perspective view of a cooking instrument having glass cooking bowl according to a desirable embodiment of the present invention;

FIG. 3 is a perspective view showing a lower face of a glass bowl portion in a cooking instrument having glass cooking bowl according to a desirable embodiment of the present invention;

FIG. 4A is a diagram showing that a cooking bowl and a bowl base are engaged in a screw engaging way in a cooking instrument having glass cooking bowl according to a desirable embodiment of the present invention;

FIG. 4B is a diagram showing that a cooking bowl and a bowl base are engaged in a bolting engaging way in a cooking instrument having glass cooking bowl according to a desirable embodiment of the present invention;

FIGS. 5A and 5B are diagrams showing that a cover portion is assembled to an upper portion of a glass cooking bowl using a magnetic switch in a cooking instrument having glass cooking bowl according to a desirable embodiment of the present invention;

FIGS. 6A to 6D are diagrams showing that a cover portion is assembled to an upper portion of a glass cooking bowl using a micro switch in a cooking instrument having glass cooking bowl according to a desirable embodiment of the present invention;

FIG. 7 is an exploded perspective view of a grip portion of a cooking instrument having glass cooking bowl according to a desirable embodiment of the present invention;

FIG. 8 is a top plan view in a status that a grip portion is dissembled of a cooking instrument having glass cooking bowl according to a desirable embodiment of the present invention;

FIG. 9 is a bottom rear view in a status that a grip portion is assembled of a cooking instrument having glass cooking bowl according to a desirable embodiment of the present invention;

FIG. 10 is a top plan view in a status that a grip portion is assembled of a cooking instrument having glass cooking bowl according to a desirable embodiment of the present invention;

FIG. 11 is a cross-sectional view in a status that a grip portion is assembled of a cooking instrument having glass cooking bowl according to a desirable embodiment of the present invention;

FIG. 12 is a diagram for description of installation status of an electric wiring connected to an open-close sensing switch when grinding cooking of a cooking instrument having glass cooking bowl according to a desirable embodiment of the present invention;

FIG. 13 and FIG. 14 are perspective views showing one side face of a cooking instrument having glass cooking bowl according to a desirable embodiment of the present invention; and FIG. 15 is a perspective view showing a main body portion of a cooking instrument having glass cooking bowl according to a desirable embodiment of the present invention.

DETAILED DESCRIPTION OF THE INVENTION

For the terminologies used in this specification, general ones are chosen which are currently as widely used as possible considering functions in the present invention, while this may vary according to intention of technician working in the field, custom, advent of new technology or the like. And in a specific case, there may be some terminologies selected by the applicant arbitrarily, at which case the meaning may be written at corresponding portion in the description. Accordingly, it should be noted that the terminologies used in the specification should be interpreted based on the practical meaning which the terminology have and content over the whole specification, not by mere designation of the terminology.

FIG. 1 is a perspective view of a cooking instrument having glass cooking bowl according to a desirable embodiment of the present invention; FIG. 2 is an exploded perspective view of a cooking instrument having glass cooking bowl according to a desirable embodiment of the present invention; and FIG. 3 is a perspective view showing a lower face of a glass bowl portion in a cooking instrument having glass cooking bowl according to a desirable embodiment of the present invention.

Referring to FIG. 1 to FIG. 3, the cooking instrument having glass cooking bowl according to a desirable embodiment of the present invention may comprise a glass bowl portion 100 and a main body portion 200.

Herein, the glass bowl portion 100 may comprise a glass cooking bowl 110 which is formed in a shape for cooking ingredient to be inserted, and on one side outer side face of which a grip base 111 is extended and formed integrally; a bowl base 120 which is engaged in a screw engaging way or assembled in a bolting assembly way on a lower end outer circumferential face of the glass cooking bowl 110; grip portions 400 and 500 assembled and fixed with each other in close contact from both sides to enclose the grip base 111 of the glass cooking bowl 110, with maintaining closely contacted status in a vertical direction with respect to an outer circumferential face of the 상기 glass cooking bowl 110; a cover portion 140 which open-close an opened upper portion of the glass cooking bowl 110; a connection plug 150 installed on a lower face of the bowl base 120 for electric connection to the main body portion 200; a blade 160 installed inside of the glass cooking bowl 110 for grinding or mixing of cooking ingredient; a heater 170 installed on a lower face of the glass cooking bowl 110 for heating the cooking bowl 110; and an upper coupling 180 penetrated and installed at the center of the bowl base 120 and connected and installed to the blade 160.

Herein, as shown in FIG. 3, a separator plate 125 of circular shape may be formed integrally at inside middle position of the bowl base 120 of the glass bowl portion 100, so as to divide the inner space of the bowl base 120 into an upper space portion 120a and a lower space portion 120b. And at a plug installation aperture 127 formed one side of a center aperture 126 formed at center of the separator plate 125 of the bowl base 120, the connection plug 150 may be inserted and installed for electric connection to the main body portion 200. And at one side of the center aperture 126 formed at the center of the separator plate 125 installed to have step in a lower side direction inside of the bowl base 120, a connection sensing piece 129 may be fixed and installed. And in case that an upper portion of the bowl portion 100 is engaged normally to a lower portion of the main body portion 200 by the user, the connection sensing switch 230 is connected.

And, as shown in FIG. 2, the grip base 111 formed integrally to the glass cooking bowl 110 is formed in an ear shape in a desirable embodiment of the present invention, which may be formed in a variety of shapes according to the shape of the grip portions 400 and 500. And on an upper end outer circumferential face of the glass cooking bowl 110 positioned opposite to the grip portions 400 and 500, a mouth 113 of semicircular shape may be extended and formed in an outside direction to take content of the glass cooking bowl 110 with ease. And on an inner wall of the glass cooking bowl 110, a plurality of grinding saliences 115 may be formed in a vertical direction for improving grinding of cooking ingredient when grinding the cooking ingredient, which may be formed integrally to be dented in a inside direction of the glass cooking bowl 110.

Herein, the plurality of grinding saliences 115 not only can improve grinding power when rotation of cooking ingredient inside of the glass cooking bowl 110, but also can do a role of changing rotation direction of fluid included in cooking ingredient irregularly, which may be desirable to be formed to be dent in a predetermined depth for user's easy grip of slippery surface of the glass cooking bowl 110.

In addition, the glass cooking bowl 110 and the bowl base 120 may be engaged or assembled either in a screw engaging way or in a bolting assembly way. First, in case that the glass cooking bowl 110 and the bowl base 120 are assembled in a screw engaging way, as shown in FIG. 4A, a plurality of engaging screw grooves 117 may be formed on a lower end outer circumferential face of the glass cooking bowl 110 in a predetermined spacing, while a plurality of engaging screw grooves 121 may be formed on an upper end inner circumferential face of the bowl base 120 in a predetermined spacing. And a lower portion inner side face of the glass cooking bowl 110 and a heating backing plate 122 formed on the bowl base 120 to have a predetermined height may be engaged by the user using a first rubber packing 123a to engage the glass cooking bowl 110 and bowl base 120, to seal desirably the cooking ingredient contained inside of the glass bowl portion 100 from leaking.

On the other hand, in case that the glass cooking bowl 110 and the bowl base 120 are engaged in a bolting assembly way, as shown in FIG. 4B, on an inside lower face of the glass cooking bowl 110, a plurality of screw grooves 128a may be projected and formed on a lower face of a module backing plate 122a having relatively larger diameter than that of a lower end outer peripheral edge of the glass cooking bowl 110 in a predetermined spacing, while on a lower face of the bowl base 120, a plurality of bolting holes 128b may be formed in a predetermined spacing corresponding to the plurality of screw grooves 128a. And a second rubber packing 123b may be inserted and installed according to inner peripheral edge at the plurality of screw grooves 128a of the module backing plate 122a positioned on a lower face of the glass cooking bowl 110, and in a status that bolting holes 128b of the bowl base 120 are arranged, the glass cooking bowl 110 and the bowl base 120 may be assembled by the user by inserting and assembling each of the plurality of screws 128c to the screw grooves 128a and the bolting holes 128b, by which inside of the glass cooking bowl 110 can be sealed.

Herein, it is desirable that a third rubber packing 123c of ring-shaped for seal of glass cooking bowl 110 and module backing plate 122a may be inserted and installed at an upper end outer peripheral portion of the module backing plate 122a. And it is desirable that the upper coupling 180 installed to transfer driving force generated at the driving force generator 260 to the blade 160 installed inside of the glass cooking bowl 110 is penetrated and installed at the center portion of the module backing plate 122a. And it is desirable that the heater 170 is installed on a lower face of the module backing plate 122a.

On the other hand, as shown in FIG. 2, the cover portion 140 may have a through opening 141 formed at the at the center portion formed to open-close the opened upper end outer peripheral edge of the cooking bowl 110, a handle 143 extend and formed integrally on an arbitrary one side outer side face, and a pair of vertical engaging grooves 144 formed to have a predetermined width on an inner side face of the through opening 141, which not only may do a role of passage to exhaust steam generated inside of the glass cooking bowl 110 when cooking, but also may facilitate using the cap 147 without slipping away in a vertical direction during cooking by rotating the cap 147 in a horizontal direction in a status that a pair of engaging saliences 148 formed on a lower end outer side face of the cap 147 is inserted in a pair of vertical engaging grooves 144 in a vertical direction when the user engaging the cap 147. The cap 147 like the above may be desirable to have not only function of stopper of the glass cooking bowl 110 as shown in FIG. 2, but also have a measuring scale formed on an outer side face to be able to be used as a measuring cup used when inserting cooking ingredient with being formed to be opened at a lower end portion and to have cylinder shape with a predetermined length.

On the other hand, at least one pair or more of locking bumps 112a and 112b may be projected and formed integrally on an upper end outer circumferential face of the glass cooking bowl 110 as shown in FIG. 2, while locking latches 146a and 146b of ⊏ (squared U) shape assembled to the locking bumps 112a and 112b may be extended and formed integrally on an outer circumferential face of the cover portion 140, as shown in FIG. 2, by which a negligent accident by accidental out exhaustion of content being cooked when the cooking instrument is inclined or fallen can be prevented caused by verifying engaging status of the cover portion 140 and the grip portions 400 and 500 more securely.

Accordingly, for the cover portion 140 to seal an upper portion of the glass cooking bowl 110, either a magnetic switch 330 or a micro switch 340 which may transfer a first connection control signal which become switching on when a pair of locking latches 146a and 146b of the cover portion 140 may be assembled to the locking bumps 112a and 112b of the glass cooking bowl 110, while become switching off when the pair may be dissembled to the control circuit portion 270 may be installed to an upper portion space of the grip portions 400 and 500. In FIG. 1 according to a desirable embodiment of the present invention, a symbol of ▶ is formed at a seizing portion 143 of the cover portion 140, while a symbol of ◀ is formed on an outer face of the grip portions 400 and 500. Thus, the user can identify the locking position of the seizing portion 143 of the cover portion 140 and the grip portions 400 and 500 by matching the two symbols in a vertical direction.

For example, as shown in FIGS. 5A and 5B, in case that the magnetic switch 330 having a first fixed contact point 331 is fixed and installed at an upper portion space of the grip portions 400 and 500, a first movable contact point 333 is fixed and installed at an inside or outside of the seizing portion 143 formed at outside of the cover portion 140. Therefore, as the user may engage the cover portion 140 normally to an upper portion of the glass cooking bowl 110, when the first fixed contact point 331 and first movable contact point 333 may exist within a preset predetermined spacing, it may become switching on, while when the user may detach the cover portion 140 from an upper portion of the glass cooking bowl 110 or may not engage normally, since the first fixed contact point 331 and first movable contact point 333 may not exist within a preset predetermined spacing, it may become switching off.

On the other hand, as shown in FIGS. 6A to 6D, in case that the micro switch 340 having a switch lever 343 to do switching on/off of a second fixed contact point 341 on a lower face of the upper plate 420 elastically using a spring 344 is fixed and installed, a second movable portion 345 is formed at an outside of the seizing portion 143 formed outside of the cover portion 140. Thus, when the user may normally engage the cover portion 140 to an upper portion of the glass cooking bowl 110, the cover portion 140 is assembled normally and the second movable portion 343 may press the switch lever 343 with a predetermined pressure, by which, as shown in FIG. 6C, the second fixed contact point 341 and second movable contact point 342 are connected with each other to become switching on, while when the user may detach the cover portion 140 from an upper portion of the glass cooking bowl 110 or may not engage normally, it becomes to a status where the second movable portion 345 is separated from the switch lever 343, and thereby, as shown in FIG. 6D, the second fixed contact point 341 and second movable contact point 342 are not connected with each other, to become switching off.

FIG. 7 is an exploded perspective view of a grip portion of a cooking instrument having glass cooking bowl according to a desirable embodiment of the present invention; and FIG. 8 is a top plan view in a status that a grip portion is dissembled of a cooking instrument having glass cooking bowl according to a desirable embodiment of the present invention.

Referring to FIG. 7 and FIG. 8, the grip portions 400 and 500 of the cooking instrument having glass cooking bowl according to a desirable embodiment of the present invention may comprise first and second base portions 410 and 510 to be closely contacted each other and be assembled to form a bilateral symmetry structure, an upper plate 420 formed integrally at an upper end portion of the first base portion 410, and first and second grip pipes 430 and 530 formed integrally with first and second base portions 410 and 510 and upper plate 420.

Herein, the first and second base portions 410 and 510 may be closely contacted each other and may be assembled to form a bilateral symmetry structure. And each of the first and second upper openings 411 and 511 and the first and second lower openings 413 and 513 may be formed at an upper end portion and lower end portion for the grip base 111 to penetrate in an assembled status. And the first and second bending ends 417 and 517 bent in a perpendicular direction according to an outer circumferential face may be extended and formed in a lateral direction in a predetermined length for a predetermined heat declining space A110 to be formed between that and an outer circumferential face of the glass cooking bowl 110 in a status of being fixed to an outer circumferential face of the glass cooking bowl 110. Thus, as shown in FIGS. 5A, 5B and FIG. 7, the lateral length d1 of lower end face of the first or second bases 410 or 510 which are assembled each other may be formed relatively longer than the lateral length d2 of an upper end face.

In addition, the upper plate 420 may be extended and formed integrally at an upper portion of the first or second bases 410 or 510 in a horizontal direction. And a sensor installation aperture 421 in which a foam detection sensor for detecting open-close of the glass cooking bowl 110 or an open-close detecting sensor 330 such as a magnetic switch or micro switch may be fixed and installed may be formed at a lower face. And when the first and second base portions 410 and 510 may be assembled, an upper portion of the first or second bases 410 or 510 may be covered.

In addition, the first and second grip pipes 430 and 530 may be assembled with close contact each other. And the first and second gripping openings 440 and 540 may be formed at the center portion in an assembled status. And it is extended and formed integrally with the first and second base portions 410 and 510 and upper plate 420 with forming a grip base installation space A120 in which the grip base 111 is inserted. And outside upper end portion may be connected to an upper portion of the first and second base portions 410 and 510 and upper plate 420, while inside upper end portion to the first and second upper openings 411 and 511. And outside lower end portion may be connected to a lower portion of the first and second base portions 410 and 510, while inside lower end portion to the first and second lower openings 413 and 513. And each of the first upper engaging protrusion 431 and first lower engaging protrusion 435 may be projected and formed at a position where the first upper opening 411 and first lower opening 413 may contact, while each of the second upper engaging protrusion 531 and second lower engaging protrusion 535 may be projected and formed at a position where the second upper opening 511 and second lower opening 513 may contact.

In addition, as shown in FIG. 9 to FIG. 11, each of third steps 434a and 434b may be formed on an outside end face of the first grip pipe 430, while each of fourth steps 534a and 534b may be formed on an outside end face of the second grip pipe 530. And it may be desirable that the shape of the third steps 434a and 434b and fourth steps 534a and 534b may be formed as in a shape shearing each other as in L shape or reverse L shape.

In addition, as shown in FIG. 9 to FIG. 11, a plurality of second detachable pieces 537a and 537b may be projected and formed on an outside end face of the second grip pipe 530, while each of a plurality of second detachable grooves 437a and 437b may be projected and formed on an outside end face of the first grip pipe 430 corresponding to the plurality of second detachable pieces 537a and 537b.

Herein, as shown in FIG. 7 and FIG. 8, a plurality of first reinforcing ribs 415 of straight shape may be formed integrally on a lower face of the first base portion 410 in a lateral direction in a predetermined spacing. And a plurality of first detachable grooves 416 may be formed at a lower face inner side end portion positioned between each of first reinforcing ribs 415 in a predetermined spacing. On the other hand, a plurality of third reinforcing ribs 515 of straight shape may be formed integrally on a lower face of the second base portion 510 in a lateral direction in a predetermined spacing to shear to each of the first reinforcing ribs 415. And a plurality of second detachable pieces 516 may be projected and formed integrally between lower face inner side end portion of the second base portion 510 and each of third reinforcing ribs 515 in an outside direction. Accordingly, in case that the first base portion 410 and second base portion 510 may be closely contacted each other and be assembled by the user, a plurality of second detachable pieces 516 may be assembled elastically to a plurality of first detachable grooves 416.

In addition, when the first and second base portions 410 and 510 may be closely contacted each other to form a bilateral symmetry structure, the first step 414 of the first base portion 410 and the second step 514 of the second base portion 510 may be closely contacted with shearing each other. And as shown in FIG. 8, it may be desirable that, as in a desirable embodiment of the present invention, in the first step 414 of the first base portion 410, an outer face may be formed relatively longer than a lower face, while in the second step 514 of the second base portion 510, an outer face may be formed relatively shorter than lower face.

In addition, in a status that the first and second base portions 410 and 510 may be closely contacted each other and be assembled to form a bilateral symmetry structure, it may be desirable that, as shown in FIG. 8, the first vertical inner circumferential face 412 of the first base portion 410 and the second vertical inner circumferential face 512 of the second base portion 510 corresponding to the first bending end 417 and second bending end 517 may be formed so that the thickness becomes thinner as it goes to an outside end portion.

Accordingly, as shown in FIG. 9, in a status of being fixed on an outer circumferential face of the glass cooking bowl 110, a predetermined heat declining space A110 may be formed between an outer circumferential face of the glass cooking bowl 110 and first and second base portions 410 and 510 in proportion to height of the first bending end 417 and second bending end 517. Thus, in case of heating inside of the glass cooking bowl 110, the heat generated from inside of the glass cooking bowl 110 may be decreased at the heat declining space A110, by which transfer of high-temperature to the hands of the user may be prevented.

In addition, as shown in FIG. 7 and FIG. 8, each of a first and second upper guiders 433 and 533 for guiding an installation position of the grip base 111 may be projected and formed integrally on an inner face of the first and second grip pipes 430 and 530 neighboring to the first and second upper openings 411 and 511. And the first and second upper guiders 433 and 533 may guide the installation position of the grip base 111, and prevent sway or movement of the grip base 111 owing to vibration generated when grinding food ingredient contained inside of the glass cooking bowl 110 in a status where the grip base 111 is installed.

On the other hand, as shown in FIG. 8 and FIG. 12, each of first engaging hole 432 and second engaging hole 436 may be formed in which screw thread is formed in a predetermined depth at the center portion of the first upper engaging protrusion 431 and first lower engaging protrusion 435 of the first base portion 410, while a second engaging hole 532 in which each of engaging spots (not shown) may be formed in a predetermined depth may be penetrated and formed at the center portion of the second upper engaging protrusion 531 and second lower engaging protrusion 535 of the second base portion 510. Herein, the length of the first upper engaging protrusion 431 and first lower engaging protrusion 435 may be formed relatively longer than that of second upper engaging protrusion 531 and second lower engaging protrusion 535, while the outer diameter of the first upper engaging protrusion 431 and first lower engaging protrusion 435 may be formed smaller than or equal to the inner diameter of the second upper engaging protrusion 531 and second lower engaging protrusion 535.

Accordingly, in case that the first and second grip portions 400 and 500 may be assembled with each other, the first upper engaging protrusion 431 and first lower engaging protrusion 435 of the first base portion 410 may be inserted by a predetermined length inside of the second upper engaging protrusion 531 and second lower engaging protrusion 535 of the second base portion 510. And using fixing bolts 610 and 620 inserted from outside direction of the second upper engaging protrusion 531 and second lower engaging protrusion 535, the first and second grip portions 400 and 500 can be fixed with each other.

On the other hand, in case that the first and second grip portions 400 and 500 are assembled, a support aperture 521 accommodating the sensor installation aperture 421 for supporting on a lower face and side face may be formed integrally at an upper end portion of the second grip pipe 530. Thus, even though vibration may be generated when food ingredient inside of the glass cooking bowl 110 is grinded, sway or movement of sensor installed on the sensor installation aperture 421 can be prevented, by which original installation position can be maintained.

In addition, a plurality of second reinforcing ribs 438 of U shape may be projected and formed integrally on an inner side face of the first grip pipe 430 in a lateral direction in a predetermined spacing. And each of the second reinforcing ribs 438 may be separated and formed as reinforcing rib 438a of straight type and reinforcing rib 438b of L shape with wiring installing cut section 439 each formed on one side edge as the center. And a plurality of fourth reinforcing ribs 538 of U shape may be projected and formed integrally on an inner side face of the second grip pipe 530 in a lateral direction in a predetermined spacing.

Accordingly, in case that the first and second grip pipes 430 and 530 are assembled each other with enclosing an outer side face of the grip base 111, the grip base 111 may be installed between a plurality of second reinforcing ribs 438 and a plurality of fourth reinforcing ribs 538. And an electric wiring 350 connected to sensor installed in the sensor installation aperture 421 may be installed at a wiring installing cut section 439 each formed at one side edge of each of second reinforcing rib 438 in a vertical direction. Thus, even though vibration may be generated when food ingredient inside of the glass cooking bowl 110 may be grinded, sway or movement of the electric wiring 350 installed at a wiring installing cut section 439 may be prevented.

As described above, in the grip structures 400 and 500 of the cooking instrument having glass cooking bowl according to a desirable embodiment of the present invention, (1) when the first step 414 of the first base portion 410 and the second step 514 of the second base portion 510 may contact closely shearing with each other, and at the same time, when the third steps 434a of the first grip pipe 430 and the fourth steps 534a and 534b of the second grip pipe 530 may contact closely shearing with each other, (2) each of the first detachable piece 516 of the second base 510 may be assembled to the first detachable groove 416 of the first base 410, and at the same time, each of the second detachable pieces 537a and 537b of the second grip pipe 530 may also be assembled to the second detachable grooves 437a and 437b of the first grip pipe 430, and (3) the fixing bolts 610 and 620 may be inserted by the user from an outside direction of the second upper engaging protrusion 531 and second lower engaging protrusion 535, and may be fixed in a way being fixed in a predetermined depth at first engaging hole 432 of first upper engaging protrusion 431 and second engaging hole 436 of first lower engaging protrusion 435 in which a screw thread may be formed respectively.

On the other hand, as shown in FIG. 2, the foam detection sensor 310 and/or temperature detection sensor 320 for detecting the foam generated inside of the glass cooking bowl 110 is reaching a preset upper portion critical position may be installed at the sensor installation aperture 421 formed on a lower face of the upper plate 420. And the temperature detection sensor 320 for detecting temperature of inside of the glass cooking bowl 110 may be installed at an inside lower portion of the grip pipes 430 and 530 or/and at a lower face of the heating backing plate 122 or the module backing plate 122a. And the control circuit portion 270 can supply power source supplied from the main body portion 200 to each of foam detection sensor 310 or/and temperature detection sensor 320 through the connection plug 150 and plug socket 250 via the electric wiring 350 arranged along the cut section 439 formed midst of second reinforcing rib 438 formed in a vertical direction inside of the grip pipes 430 and 530.

Herein, in case that the length of the grip pipes 430 and 530 of the grip portions 400 and 500 may exceed the engaging and contacting portion of the glass cooking bowl 110 and bowl base 120 to be extended and formed to overlap with the upper end portion of the bowl base 120 as shown in FIG. 7A to FIG. 7B, or the length of the grip pipes 430 and 530 of the grip portions 400 and 500 may be extended and formed to a lower face of the bowl base 120, the foam detection sensor 310 for detecting that foam generated inside of the glass cooking bowl 110 may be reaching a preset upper portion critical position may be installed at an upper portion head portion 133 of the grip portions 400 and 500 to be contacted to an outer wall of the glass cooking bowl 110. And at a lower portion of the grip pipes 430 and 530 of the grip portions 400 and 500 or on a lower face of the heating backing plate 122, the temperature detection sensor 320 may be installed to contact to an outer wall of the glass cooking bowl 110 or to contact to a lower face of the heating backing plate 122 for detecting temperature inside of the glass cooking bowl 110.

Herein, the power source supplied from the main body portion 200 may be supplied each of either the foam detection sensor 310 or/and the temperature detection sensor 320 or the open-close detection sensor 330 via the electric wiring 350 arranged according to an inner space formed in a vertical direction inside of the grip pipes 430 and 530 of grip portions 400 and 500.

Herein, as shown in FIG. 2 by a dotted line, the foam detection sensor 310 may be fixed and installed in an installation groove 119 in case that the installation groove 119 of U shape is formed at an upper end portion of the glass cooking bowl 110 positioned at an upper portion of the grip portions 400 and 500, and the detecting performance and accuracy may be relatively higher than that of one in indirect sensing way.

On the other hand, as shown in FIG. 2, the main body portion 200 may comprise a housing 210 being engaged detachably to a lower end portion of the bowl base 120, and having the driving force generator 260 generating driving force at inner space formed inside, an upper base 220 formed to have relatively smaller size than that of upper end outer peripheral edge of the housing 210, and extended and formed integrally in a predetermined length and predetermined thickness in an upper portion direction, a control circuit portion 270 installed at inner space of the housing 210, and voltage converting the power source supplied from outside to supply to the heater 170 or to the driving force generator 260, a contact sensing switch 230 projected and formed on an upper face of the upper base 220, and transferring a second connection control signal to the control circuit portion 270 in which becoming switching on in case that the glass cooking bowl 110 may be engaged to a reference engaging position of the housing 210, while becoming switching off in case that it may not be engaged to a reference engaging position, a control panel 240 installed on one side outer surface of the housing 210, and for selecting one from preset cooking menu using the cooking instrument to apply a cooking command, a plug socket 250 formed integrally on a lower face of the upper space portion 211 of the housing 210 to be electrically connected to the glass bowl portion 100, and a lower coupling 280 penetrated at the center portion of the upper base 220 to be assembled at an upper coupling 180, and transferring the driving force generated at the driving force generator 260.

Herein, the contact sensing switch 230 may be projected and formed on an upper face of the upper base 220 to transfer the second connection control signal to the control circuit portion 270 in which becoming switching on in case that the glass cooking bowl 110 may be engaged at the reference engaging position of the housing 210, while becoming switching off in case that it may not be engaged at the reference engaging position. And the control circuit portion 270 may be able to supply the power source for performing the user's control command to the driving force generating portion 260 or heater 170 only in case that the first and second connection signals are detected to be switching on status.

In addition, a drainage groove 215 of ring-shaped having a predetermined width and depth may be formed at a portion in which the upper portion face of the housing 210 and the lower side outer peripheral edge of the upper base 220 may contact each other. And a drainage hole 216 may be projected and formed at an upper end portion of the housing 110 positioned at rear face of the main body portion 200 in an outside direction with being connected to the drainage groove 215. And in a case that cooking ingredient may overflow outward of the glass cooking bowl 110 during performing arbitrary cooking, the cooking ingredient may pool at the drainage groove 215 following an outer surface of the glass cooking bowl 110. And in case that the amount of overflowing cooking ingredient may be large, it may be exhausted outside through the drainage hole 216 with flowing along the drainage groove 215.

However, as shown in FIG. 8, it may be possible to form a drainage pipe 290 at the through opening penetrated and formed on an upper portion face of the housing 210 having a slope face of the lowest bottom which may reach the lower face of the housing 210 by forming an upper portion face of the housing 210 as not being flat even to have a slope to one side, and more desirably, by forming to have a slope going lowered toward an opposite direction of the plug socket 250.

On the other hand, the control circuit portion 270 installed inside of the housing 110 of the main body portion 200 may comprise an AC power source supply portion for converting a commercial power source supplied from outside to a voltage dropped AC power source, and a DC power source supply portion for converting a commercial power source to a DC power source and outputting. And the AC power source supply portion may supply directly an AC power source to the driving force generator 260 installed inside of the main body portion 200 or may supply through the connection plug 150 and plug socket 250 connected each other to the heater 170 installed on a lower face of the heating backing plate 122. And the DC power source supply portion may supply the DC power source through the connection plug 150 and plug socket 250 connected each other to the foam detection sensor 310 or temperature detection sensor 320 installed on a lower face of the grip portions 400 and 500 or heating backing plate 122.

Herein, the control circuit portion 270 may allow power source supply by determining as a status power source supply may be allowable, when the fixed contact point 139 of the magnetic switch installed at an inside upper portion of the grip pipes 430 and 530 of the grip portions 400 and 500 and the movable contact point 149 installed on a lower face of the seizing portion 143 formed outside of the cover portion 140 may be on status, and at the same time, when the connection sensing piece 129 fixed and installed on a lower face of the separator plate 125 installed inside of the bowl base 120 may be connected status to the connection sensing switch 230.

Hereinafter, with reference to drawings attached, the operation of the cooking instrument having glass cooking bowl according to a desirable embodiment of the present invention will be described.

1. Initialization Operation of the Cooking Instrument

In a status that power source is supplied to the cooking instrument, the user may put cooking ingredient of needed amount inside of the cooking bowl 110, and then may engage the cover portion 140 to an upper portion of the glass cooking bowl 110 to a locking status. And at the same time, the user may rotate the seizing portion 146 and grip portions 400 and 500 of the cover portion 140 in a horizontal direction to become a reference locking status.

At this time, the magnetic switch or micro switch installed at the sensor installation aperture 421 formed on a lower face of the upper plate 420 may become switching on status, and in case that the glass bowl portion 100 and the main body portion 200 may be engaged, the control circuit portion 270 can detect the power source supply allowable status.

2. Operation of Engagement and Connection of the Bowl Portion and the Main Body Portion And then, as shown in FIG. 2, the user may engage the glass bowl portion 100 on an upper portion of the main body portion 200, by a way that the user may pick the grip portions 400 and 500 of the glass bowl portion 100, and may put it on an upper portion of the bowl base 220 of the main body portion 200, so that it may be placed at a preset reference engaging position denoted on an upper portion of the main body portion 200.

In a desirable embodiment of the present invention, as shown in FIG. 1, the reference engaging position may be set as a position where the symbol of ▶ formed on a lower portion outer side face of the bowl base 120 and the symbol of ◀ formed to be corresponding to each other on an upper portion face of seizing project portions 213 and 214 formed on upper end both side faces of the housing 110 may be coincide in a vertical direction.

At this time, in case that the glass bowl portion 100 may be engaged to the upper portion of the main body portion 200, the connection pin 151 of the connection plug 150 formed on an inner circumferential face of the bowl base 120 may be inserted in a predetermined depth in a vertical direction to the socket groove 251 of the plug socket 250 formed at an upper portion of the housing 210, by which the glass bowl portion 100 and the main body portion 200 may become a status in which electric connection is possible. At the same time, (ii) the connection sensing piece 129 fixed and installed on a lower face of the separator plate 125 installed inside of the bowl base 120 may be engaged to the contact sensing switch 230 projected and formed on an upper face of the upper base 220, by which it may become switching on status.

Accordingly, when all of (i) magnetic switch or micro switch installed at the sensor installation aperture 421 formed on a lower face of the upper plate 420 may become switching on status, (ii) the connection plug 150 of the bowl base 120 and the plug socket 250 of the housing 210 may be connected to become a status in which electric connection is possible, and (ii) the connection sensing piece 129 of the bowl base 120 is switching on status by the contact sensing switch 230 of the engaging base 220 a satisfied, the control circuit portion 270 may determine as a power source supply status. And then it may supply selectively the power source supplied from outside to the foam detection sensor 310 or temperature sensor 320 installed inside of the glass bowl portion 100 and to the heater 170 installed on a lower face of the heating backing plate 122 according to control of the user.

3. Cooking Operation of the Cooking Instrument

And then, when the upper portion of the glass cooking bowl 110 is determined as in a locking status, and at the same time, the upper portion of the bowl portion 100 is determined to be engaged normally to a lower portion of the main body portion 200, the user may operate the control panel 240 to perform desired cooking. At this time, the control circuit portion 270 of the main body portion 200 may be able to control the driving of the driving force generator 260 or heater 170 corresponding to food (juice, porridge, soybean milk, tofu, or the like) inputted by the user.

According to the cooking instrument having glass cooking bowl according to a desirable embodiment of the present invention, not only safety may be able to be improved by increasing weight of the cooking bowl on operation of the cooking instrument having high-speed rotation motor, but also easy assembly of the glass cooking bowl and the heating engaging plate may be facilitated on assembly of the product, and further the wire for supplying power source to the foam detection sensor and temperature detection sensor may be able to be installed without exposure to outside of the cooking bowl.

Desirable embodiment of the present invention have been described above, though the present invention may not be confined by the specific embodiment above. And the present invention may be able to of course be realized in variety of deformations by a person having ordinary skill in the technical field the present invention pertains without escaping from the gist of the present invention claimed in claims attached, which should not be understood as a separate ones from the technical ideas and perspectives of the present invention.

What is claimed is:

1. A cooking instrument formed of glass and comprising:
 a glass bowl portion comprising:
  a glass cooking bowl formed such that at least one or more cooking ingredients are inputted, and comprising a grip base integrally formed on one outer side face thereof and a blade therein for either grinding or mixing the cooking ingredients; and
  a bowl base provided with a heater installed at a lower face of the glass cooking bowl and configured to heat the glass cooking bowl, and assembled to a lower end outer circumferential face of the glass cooking bowl;
  first and second grip portions assembled and fixed to each other and being contacted closely from both sides to enclose the grip base of the glass cooking bowl with maintaining the closely contacted status in a vertical direction with respect to an outer circumferential face of the glass cooking bowl; and
  a cover portion detachably assembled with the glass cooking bowl from above, and configured to open and close an upper portion of the glass cooking bowl; and
 a main body portion comprising:
  a housing detachably engaged to a lower end portion of the bowl base, and including therein a driving force generator configured to generate a driving force;
  an upper base formed on an upper portion of the housing, having a relatively smaller size than an upper end outer peripheral edge of the housing, and extended and formed integrally in a vertical direction in a predetermined length and predetermined thickness; and
  a control circuit installed at an inner space of the housing, and configured to convert a voltage of power supplied from an outside source to supply the converted voltage to the driving force generator and/or the heater, according to a control command of a user, when the cover portion is engaged with the upper portion of the glass cooking bowl and the upper portion of the glass cooking is engaged with the upper base of the main body portion
 wherein the first and second grip portions respectively comprises:
  a first upper opening and a second upper opening formed at respective upper end portions thereof;

a first lower opening and a second lower opening formed at respective lower end portions thereof; and a first bending end and a second bending end bent in a perpendicular direction according to the outer circumferential face of the glass cooking bowl, respectively, and wherein the first bending end and the second bending end are extended and formed in a lateral direction in a predetermined length to form a predetermined heat declining space.

2. The cooking instrument of claim 1, wherein a separator plate of a circular shape is formed integrally at an inside middle position of the bowl base to divide an inner space of the bowl base into an upper space portion and a lower space portion; and wherein a connection plug is inserted and installed at a plug installation aperture for electrical connection to the main body portion formed at one side of a center aperture formed at a center of the separator plate of the bowl base.

3. The cooking instrument of claim 1, wherein the bowl base is assembled to the lower end outer circumferential face of the glass cooking bowl in one of a screw engaging way or a bolting assembly way, wherein, in case that the bowl is assembled to the lower end outer circumferential face of the glass cooking bowl in the screw engaging;

a plurality of engaging screw grooves are formed on the lower end outer circumferential face of the glass cooking bowl in a predetermined spacing, and a plurality of engaging screw grooves are formed on an upper end of an inner circumferential face of the bowl base in a predetermined spacing; and a lower portion inner side face of the glass cooking bowl and a heating backing plate formed at the bowl base to have a predetermined height are engaged using a first rubber packing to seal an inside of the glass cooking bowl.

4. The cooking instrument having glass cooking bowl according to claim 1, wherein the bowl base is assembled to the lower end outer circumferential face of the glass cooking bowl in one of a screw engaging way or a bolting assembly way, wherein in case that the bowl base is assembled to the lower end outer circumferential face of the glass cooking bowl in the bolting assembly way;

a plurality of screw grooves are formed to project in a predetermined spacing on a lower face of a module backing plate having a relatively larger diameter than that of a lower end outer peripheral edge of the glass cooking bowl, and a plurality of bolting holes are formed on a lower face of the bowl base in a predetermined spacing to correspond to the plurality of screw grooves, and a second rubber packing is inserted and installed in the plurality of screw grooves of the module backing plate placed at a lower face of the glass cooking bowl according to an inner peripheral edge, and an inside of the glass cooking bowl is sealed by each of a plurality of screws being inserted and assembled to a screw groove and a bolting hole in a status that the bolting hole of the bowl base coincides.

5. The cooking instrument of claim 4, wherein a third rubber packing of a ring-shape configured to seal the glass cooking bowl and the module backing plate is inserted and installed at an upper end of an outer peripheral portion of the module backing plate, wherein an upper coupling installed to transfer the driving force generated by the driving force generator to a blade installed inside the glass cooking bowl is penetrated and installed at a center portion of the module backing plate, and wherein the heater is installed at a lower face of the module backing plate.

6. The cooking instrument of claim 1, wherein at least one pair of locking bumps is projected and formed integrally at an upper end outer circumferential face of the glass cooking bowl in an outside direction, wherein at least one pair of locking latches assembled to the locking bumps is extended and formed integrally at an outer circumferential face of the cover portion, and wherein either a magnetic switch or micro switch configured to transfer a first connection control signal to the control circuit, the first connection control signal being switched on when the pair of locking latches of the cover portion is assembled to the locking bumps of the glass cooking bowl, and being switched off when the pair of locking latches of the cover portion is dissembled from the locking bumps of the glass cooking bowl, for the cover portion to seal an upper portion of the glass cooking bowl, and the magnetic switch or the micro switch being installed at an upper portion space of the first and second grip portions.

7. The cooking instrument of claim 1, wherein the first and second grip portions further comprises:

first and second base portions assembled in a close contact with each other to form a bilateral symmetry structure in which the first and second upper openings and the first and second lower openings are formed;

an upper plate extended and formed integrally at an upper portion of the first or second base in a horizontal direction, at a lower face of which a sensor installation aperture formed at which a temperature detecting or open-close detecting sensor is fixed and installed for detecting the opening and the closing of the upper portion of the glass cooking bowl, and the upper plate covering an upper portion of the first or second base when the first and second base portions are assembled; and first and second grip pipes assembled in a close contact with each other, at a center portion of which first and second gripping openings are formed in an assembled status, the first and second grip pipes being extended and formed integrally with the first and second base portions and the upper plate, and forming a grip base installation space in which the grip base is inserted, each of a first upper engaging protrusion and a first lower engaging protrusion being projected and formed to a position where the first upper opening and first lower opening contact, and each of a second upper engaging protrusion and a second lower engaging protrusion being projected and formed to a position where the second upper opening and second lower opening contact.

8. The cooking instrument of claim 7, wherein a plurality of first reinforcing ribs of straight shape are formed integrally on a lower face of the first base portion in a lateral direction in a predetermined spacing, and a plurality of first detachable grooves are formed in a predetermined spacing at a lower face inner side end portion placed between each of the first reinforcing ribs, wherein a plurality of third reinforcing ribs of a straight shape are formed integrally on a lower face of the second base portion in a lateral direction in a predetermined spacing so that each of the first reinforcing ribs may be sheared, and a plurality of second detachable pieces are projected and formed integrally between a lower face inner side end portion of the second base portion and each of the third reinforcing ribs in an outside direction, and wherein, in case that the first base portion and the second base portion are in a close contact with each other and is assembled, the plurality of second detachable pieces are assembled to the plurality of first detachable grooves elastically.

9. The cooking instrument of claim 7, wherein each of first and second upper guiders configured to guide an installation position of the grip base is projected and formed integrally on an inner face of the first and second grip pipes neighboring the first and second upper openings.

10. The cooking instrument of claim 7, wherein each of a first engaging hole and a second engaging hole on which a screw thread is formed in a predetermined depth is formed at a center portion of the first upper engaging protrusion and first lower engaging protrusion, wherein a second engaging hole on which each of engaging spots is formed in a predetermined depth is penetrated and formed at a center portion of the second upper engaging protrusion and the second lower engaging protrusion, wherein the length of the first upper engaging protrusion the first lower engaging protrusion is formed relatively longer than that of the second upper engaging protrusion and the second lower engaging protrusion, and wherein an outer diameter of the first upper engaging protrusion and the first lower engaging protrusion is smaller than or equal to that of the second upper engaging protrusion and the second lower engaging protrusion, thereby in case that the first and second grip portions are assembled with each other, the first upper engaging protrusion and the first lower engaging protrusion are inserted into the second upper engaging protrusion and the second lower engaging protrusion in a predetermined length, and using fixing bolts inserted from an outside direction of the second upper engaging protrusion and the second lower engaging protrusion, the first and second grip portions are able to be fixed to each other.

11. The cooking instrument of claim 7, wherein a support aperture which accommodates the sensor installation aperture to support a lower face and a side face thereof, in case that the first and second grip portions are assembled, is formed integrally at an upper end portion of the second grip pipe.

12. The cooking instrument of claim 7, wherein a plurality of second reinforcing ribs of a U shape is projected and formed integrally on an inner side face of the first grip pipe in a lateral direction in a predetermined spacing, and each of the second reinforcing ribs is separated and formed respectively into a reinforcing rib of a straight bar shape and a reinforcing rib of an L shape centered around a wiring installing cut section formed at each one side edge, wherein a plurality of fourth reinforcing ribs of a U shape are projected and formed integrally on an inner side face of the second grip pipe in a lateral direction in a predetermined spacing, and wherein, in case that the first and second grip pipes are assembled with each other with enclosing an outer side face of the grip base, the grip base is installed between the plurality of second reinforcing ribs and the plurality of fourth reinforcing ribs, and an electric wiring connected to a sensor installed at the sensor installation aperture is installed at a wiring installing cut section which is formed at a one side edge of each of the second reinforcing ribs in a vertical direction.

13. The cooking instrument of claim 7, wherein an outside upper end portion of the first and second grip pipes is connected to the first and second base portions and an upper portion of the upper plate, while an inside upper end portion is connected to the first and second upper openings, and wherein an outside lower end portion of the first and second grip pipes is connected to a lower portion of the first and second base portions, while an inside lower end portion of the first and second grip pipes is connected to the first and second lower openings.

14. The cooking instrument of claim 1, wherein the main body portion 200 further comprises:

a plug socket formed integrally on a lower face of an upper space portion of the housing to be electrically connected to the glass bowl portion;

a lower coupling penetrating a center portion of the upper base, assembled to the upper coupling 180, and configured to transfer the driving force generated at the driving force generator; and a control panel installed a one side outer surface of the housing, and configured to apply a cooking command by selecting one of a preset cooking menu using the cooking instrument.

15. The cooking, instrument of claim 6, wherein a contact sensing switch formed on an upper face of the upper base transfer a second connection control signal to the control circuit, wherein the second connection control signal becomes switching on in case that the glass cooking bowl is engaged at a reference engaging position of the housing, and the second connection control signal becomes switching off in case that the glass cooking bowl is not engaged at the reference engaging position of the housing, and wherein the control circuit is configured to supply the power for performing the control command of the user to the driving force generator or/and the heater only when the first and second connection control signals are detected as a switching on status.

16. A grip structure of a cooking instrument having a glass cooking bowl, in which at least one grip base is extended and formed integrally on an outer face of the glass cooking bowl, wherein the grip structure comprises first and second grip portions assembled and fixed with a close contact with each other to enclose the grip base with maintaining a close contact status in a vertical direction with respect to an outer circumferential face of the glass cooking bowl and wherein the first and second grip portions comprise:

first and second base portions which are in a close contact with each other and are assembled to form a bilateral symmetry structure, wherein each of first and second upper openings and first and second lower openings is formed at an upper end portion and a lower end portion of the first and second base portions such that the grip base penetrates in an assembled status, and first and second bending ends bent in a perpendicular direction along the outer circumferential face of the glass cooking bowl are extended and formed at the first and second base portions in a lateral direction in a predetermined length such that a predetermined heat declining space is formed between the first and second base portions and the outer circumferential face of the glass cooking bowl in a status where the first and second base portions are fixed to the outer circumferential face of the glass cooking bowl;

an upper plate extended and formed integrally at an upper portion of the first or second base portions in a horizontal direction, wherein a sensor installation aperture is formed at the upper plate, either a temperature detecting or open-close detecting sensor for detecting opening and closing of the glass cooking bowl is fixed and installed at the lower face of the sensor installation aperture, and the upper plate covers an upper portion of the first or second bases when the first and second base portions are assembled; and first and second grip pipes assembled with a close contact with each other, wherein first and second gripping openings are formed, in an assembled status, at a center portion of the first and second grip pipes, the first and second grip pipes are extended and formed integrally with the first and second base portions and the upper plate while a grip base installation space in which the grip base is inserted is formed, each of a first upper engaging protrusion and a first lower engaging protrusion is projected and formed at a position where the first upper opening and the first lower opening contact, and each of a second upper engaging protrusion and a second lower engaging protrusion is projected and formed at a position where the second upper opening and the second lower opening contact.

* * * * *